United States Patent
White et al.

(10) Patent No.: US 8,651,431 B1
(45) Date of Patent: Feb. 18, 2014

(54) AIRCRAFT WITH MOVABLE WINGLETS AND METHOD OF CONTROL

(75) Inventors: Edward Val White, St. Charles, MO (US); Blaine Knight Rawdon, San Pedro, CA (US); Zachary C. Hoisington, Long Beach, CA (US); Christopher K. Droney, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 13/206,317

(22) Filed: Aug. 9, 2011

(51) Int. Cl.
*B64C 3/40* (2006.01)
*B64C 9/00* (2006.01)

(52) U.S. Cl.
USPC .......... 244/218; 244/46; 244/90 R; 244/199.4

(58) Field of Classification Search
USPC ............. 244/199.4, 199.3, 199.2, 199.1, 198, 244/218, 46, 39, 90 R
See application file for complete search history.

(56) References Cited

U.S. PATENT DOCUMENTS

| | | | | |
|---|---|---|---|---|
| 1,710,673 A | * | 4/1929 | Bonney | 244/215 |
| 1,967,795 A | * | 7/1934 | Wallis | 244/35 R |
| 2,961,196 A | * | 11/1960 | Atkinson | 244/46 |
| 3,044,734 A | * | 7/1962 | Heppe | 244/193 |
| 3,064,928 A | * | 11/1962 | Toll | 244/46 |
| 3,218,005 A | * | 11/1965 | Alvarez Calderón | 244/218 |
| 3,447,761 A | * | 6/1969 | Whitener et al. | 244/46 |
| 4,722,499 A | | 2/1988 | Klug | |
| 5,039,032 A | | 8/1991 | Rudolph | |
| 5,899,410 A | * | 5/1999 | Garrett | 244/46 |
| 5,988,563 A | | 11/1999 | Allen | |
| 6,089,502 A | | 7/2000 | Herrick et al. | |
| D488,765 S | | 4/2004 | Boren | |
| 6,722,615 B2 | | 4/2004 | Heller et al. | |
| 7,275,722 B2 | | 10/2007 | Irving et al. | |
| 7,780,120 B1 | | 8/2010 | Fairchild | |
| 2009/0200431 A1 | | 8/2009 | Konings et al. | |

* cited by examiner

*Primary Examiner* — Tien Dinh
*Assistant Examiner* — Richard R Green
(74) *Attorney, Agent, or Firm* — James M. Poole

(57) ABSTRACT

A method and apparatus for improved aircraft control through the use of adjustable winglets. The adjustable winglets are located at the terminal ends of an aircraft's wings and may pivot about an axis parallel to the yaw axis of the aircraft. The adjustable winglets may also include outboard ailerons for improved control of the aircraft.

7 Claims, 7 Drawing Sheets

AIRCRAFT WITH MOVABLE WINGLETS AND METHOD OF CONTROL

As provided under 35 U.S.C. §119(e), this application claims the benefit of provisional application Ser. No. 61/572,282 filed Aug. 4, 2011.

BACKGROUND

The present invention relates to aircraft wings and more particularly to an improved aircraft tip device with aileron control.

The use of raked wing tips to improve aircraft dynamics is well known in the art. Traditional swept wing aircraft include a trapezoidal-shaped wing with a single leading edge. For commercial aircraft, the wing sweep angle may be between 0 and 40 degrees. This swept back wing provides advantages by reducing drag at higher speeds. Improvements made to the wing tips have further improved wing efficiency by reducing induced drag.

One method of improving the performance of swept wings is the use of raked wing tips. U.S. Pat. No. 5,039,032 to Rudolph, herein incorporated by reference in its entirety, describes the benefits of a highly tapered wing tip extension added to the tip of an existing swept airplane wing that reduces high speed drag. This tapered wing tip may include a wing sweep of 40 degrees or more. The improvement improves aircraft performance by decreasing induced drag while increasing the aspect ratio of the wing.

U.S. Pat. No. 6,089,502 to Herrick et al., herein incorporated in its entirety, improves on the wing tip extension concept developed in Rudolph by utilizing blunt leading edge raked wing tips. The improved wing tip extensions described in Herrick are useful for aircraft designed to operate at high subsonic Mach numbers (at or greater than 0.7). This application overcomes the need for a leading edge high-lift device (such as a slat) that is required for raked wing tips having a leading edge sweep between 40 and 50 degrees. The inventors in Herrick determined that an aircraft with blunt leading edge raked wingtips therefore improved over the raked wing tips described by Rudolph.

One issue not resolved with such wing tip designs is the changing flight dynamics as an aircraft changes speed, altitude, and flight conditions. A specific area where flight dynamics change is the use of ailerons during takeoff and landing.

Ailerons on an aircraft can be used to modify the roll angle of the aircraft, usually used for turning the aircraft during flight. This is accomplished by changing the magnitude of the roll moments on each wing. For example, to roll an aircraft to the right at low speeds, a left aileron may be positioned to extend below the left wing and a right aileron positioned to extend above the right wing. The downwardly positioned aileron increases lift on the left wing while the upwardly positioned aileron decreases the lift on the right wing. This changes the roll moment, causing the aircraft to roll in the direction of the upwardly positioned right aileron.

At higher speeds, the aircraft may experience control reversal due to the characteristics of the wing and aileron. A downwardly positioned aileron creates a higher lift on the trailing edge of a wing, and at high speeds the lift differential between the leading and trailing edges may cause the wing to twist leading edge down. This twisting causes the aircraft to turn in the direction opposite of what was intended. The control reversal speed is the point at which this control reversal occurs. However, control of the aircraft near this control reversal speed may be sluggish or nonresponsive. The chord length of the wing, position of the aileron relative the aircraft fuselage, and thickness of the wing are all factors in determining the control reversal speed.

In commercial aircraft, ailerons positioned near the tips of the aircraft (outboard ailerons) are useful for low-speed maneuvers, but the control reversal speed is sufficiently low that control reversal has occurred by the time the aircraft reaches cruising speed. In order to avoid the issue of control reversal and avoid sluggish or nonresponsive control, secondary (inboard ailerons) may be disposed inboard of the outboard ailerons. Because of their position on the wing, the control reversal speed is increased as the force differential required to twist the wing is increased. However, the amount of energy required to operate these inboard ailerons may be increased as the lift differential is not as great, and the operation of these inboard ailerons may create more drag.

Additionally, for any given aircraft condition, based on weight, geometry, airspeed and atmospheric conditions, there is an ideal lift distribution where induced drag is minimized. The geometry of an aircraft is generally fixed, based on the wing geometry, airfoil shape, chord length and wingspan. Other conditions, including weight and atmospheric conditions, are generally uncontrollable during the flight as well. Therefore, the lift distribution of the aircraft must be determined for a preferred set of circumstances during design of the aircraft.

A final area where improvements may be made is in the use of wingspan. As is well known in the art, the wingspan of an aircraft has a significant impact on the efficiency and lift distribution of an aircraft in flight. However, aircraft wingspans may be limited by space considerations at airports. A wide wingspan may be preferable, but may not always be acceptable due to space considerations between airport gates or in hangars, for example.

Therefore, there is realized in the art a need for an aircraft with increased efficiency while maintaining the wingspan requirements of airports.

There is further realized a need in the art a novel method and apparatus for improving control of aircraft while avoiding sluggish or nonresponsive roll control at or near control reversal speed.

There is further realized a need in the art for control mechanisms that avoid the issue of control reversal which may lead to pilot confusion.

There is further realized a need in the art for an aircraft that is capable of altering the lift distribution on the aircraft so as to approach an ideal condition.

SUMMARY

This disclosure is directed to an aircraft wing having movable winglets that may pivot about an axis. The axis about which the winglets pivot may be approximately perpendicular to the upper surface of the wing. The term "winglet" as used herein refers to a discrete outboard component of an aircraft wing and does not refer to known airplane winglets that comprise outboard portions of the wing angled sharply upward.

According to further embodiments, the winglets may be moveable between a fully extended position where their sweep is substantially similar to the sweep of the wing and a fully raked position where their sweep is greater than the sweep of the wing.

According to further embodiments, the winglets may include control ailerons for controlling the roll of the aircraft.

According to further embodiments, the winglets may include a filler between the main wing portion and the winglet, and the filler may be either a solid or telescoping element.

Also described herein is a novel method of controlling an aircraft during flight. This includes the steps of providing an aircraft with a swept back wing and a winglet pivotable about an axis approximately parallel to the yaw axis of the aircraft. An aileron on the trailing edge of the winglet is provided for controlling the aircraft. The winglets may be pivoted between a fully extended position to a fully raked position according to the speed of the aircraft.

According to further embodiments, the effective center of pressure increment provided by deflection of the aileron may be movable from a position approximately collinear with the torsional axis of the wing to a position aft of the torsional axis. The aft position provides a longer control moment arm to induce wing twist.

Further described herein is a method of increasing the efficiency of an aircraft during flight. For each combination of fuel load and distribution, payload, center of gravity and dynamic pressure there is an optimum combination of winglet sweep angle and winglet aileron deflection to minimize cruise drag. The instant lift distribution based on the above factors may also be determined. The method may include the steps of providing an aircraft with a wing and a winglet attached to an outboard side of the wing, wherein the winglet is pivotable about an axis approximately parallel to the yaw axis of the aircraft. The winglet may be pivoted about the axis to improve the lift distribution from the instant combination towards the optimum combination to minimize cruise drag. In addition, the method may include the steps of providing a winglet with a pivotable aileron and deflecting the aileron in response to instant flight conditions.

The features, functions, and advantages that have been discussed can be achieved independently in various embodiments of the present invention or may be combined in yet other embodiments further details of which can be seen with reference to the following description and drawings.

DESCRIPTION

Figure 1:
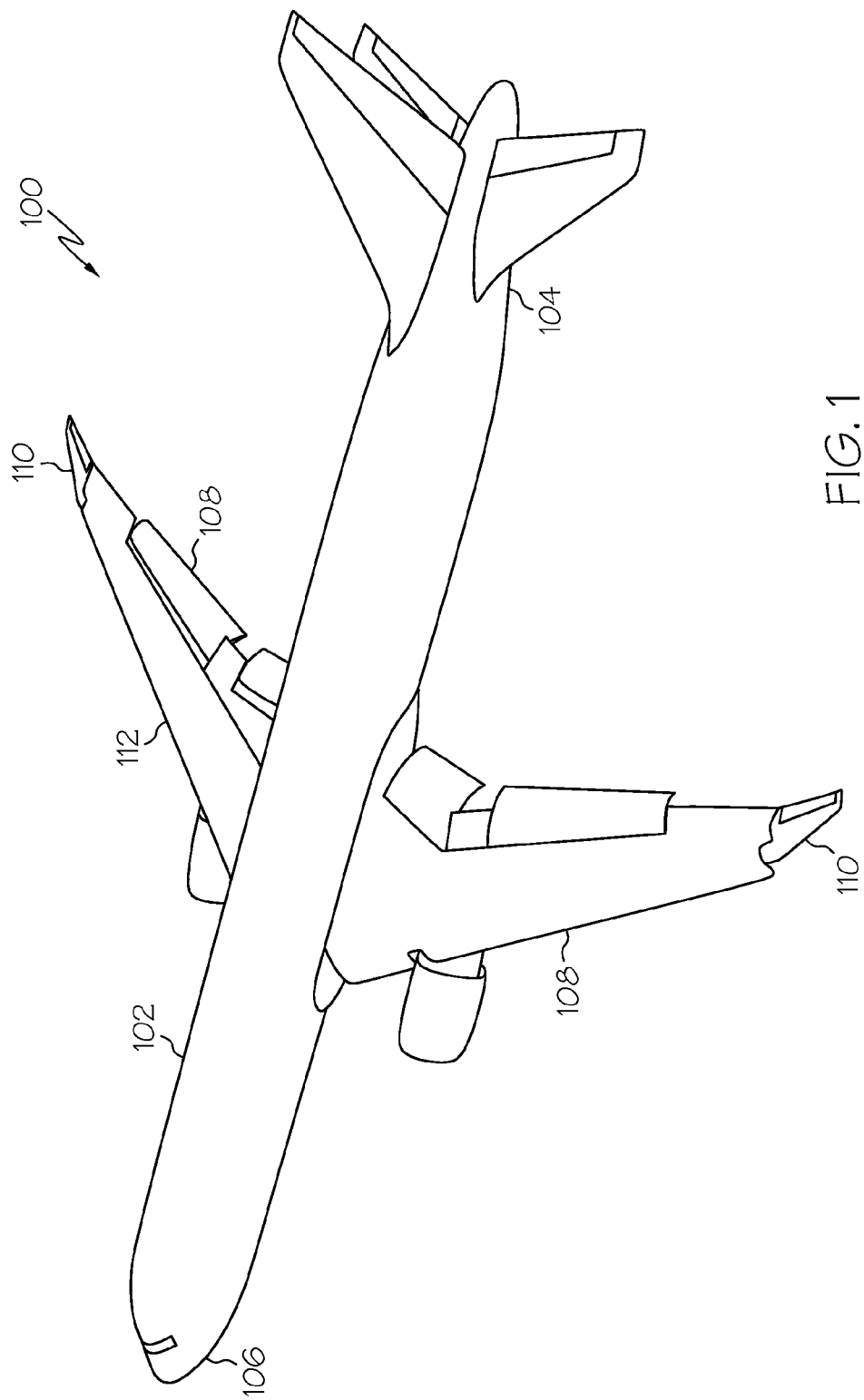
FIG. 1 shows a perspective view of an aircraft according to the present invention.

As shown in FIG. 1, an aircraft generally designated 100 may include a fuselage 102, tail 104, nose 106 and wings 108. Winglets 110 may be positioned at the ends of the wings 108. Each wing 108 of the aircraft may consist of a fixed wing portion 112 connected to the aircraft fuselage 102 and the movable winglet 110 connected to the fixed wing portion 112. While the aircraft 100 is generally illustrated as having a fuselage, separate wings, and a vertical tail, it will be apparent to those having skill in the art that the aircraft 100 may be a flying wing aircraft without a discreet fuselage, may include various tail designs or no discreet tail, may include swept-forward or unswept wings, and may generally vary in size, shape, and design without departing from the scope of the invention.

Figure 2A:
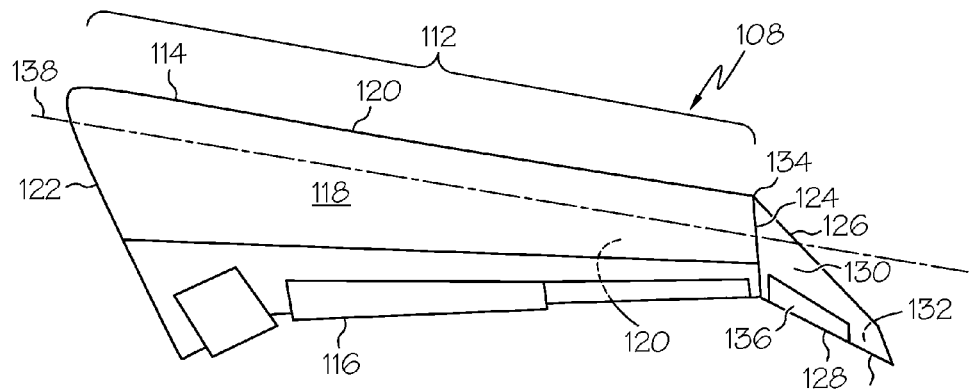
FIG. 2A is a perspective view of the right or starboard wing of the aircraft of FIG. 1 having a winglet in a fully raked position.
Figure 2B:
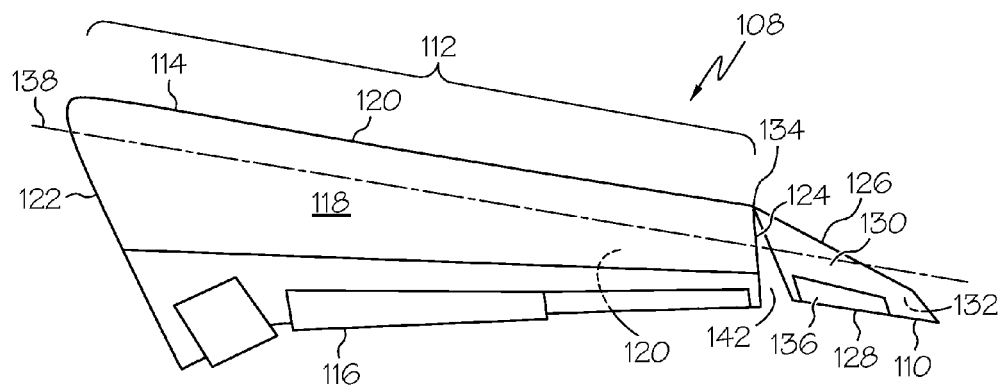
FIG. 2B is a perspective view of the wing of FIG. 2A with the winglet in an intermediate position.
Figure 2C:
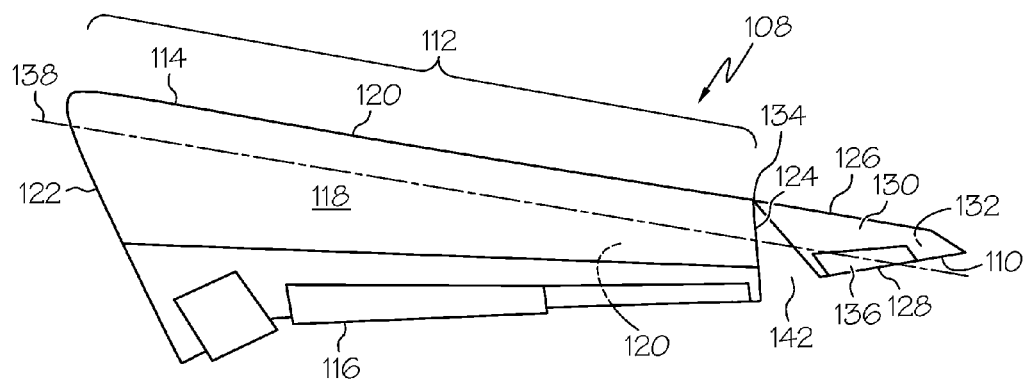
FIG. 2C is a perspective view of the wing of FIG. 2A with the winglet in a fully extended position.

FIGS. 2A, 2B and 2C show the right or starboard aircraft wing 108 of the aircraft 100 of FIG. 1 in further detail. Although only the right or starboard wing 112 is shown, it is to be understood that the following description applies to the left or port wing 108 shown in FIG. 1 as well, but in reverse. The fixed wing portion 112 may be a conventional wing shape consisting of an airfoil having a leading edge 114, trailing edge 116 and upper 118 and lower 120 surfaces. The fixed wing portion 112 also may include an inboard side 122 that may be connected to the fuselage 102 (FIG. 1) and an outboard side 124. The movable winglet 110 is pivotably connected to the outboard side 124 and extends the wingspan of the aircraft 100. Similar to the fixed wing portion 112, the winglet 110 may include a leading edge 126, trailing edge 128 and top 130 and bottom 132 surfaces.

The winglet 110 may be attached to the fixed wing portion 112 to be pivotable about a centerpoint 134 that allows the winglet to pivot from a fully raked position (FIG. 2A) to a fully extended position (FIG. 2C) or any point therebetween, such as the intermediate position shown in FIG. 2B. The pivot axis of the centerpoint 134 may be oriented relative to the fixed wing portion 112 such that the top 130 and bottom 132 surfaces of the winglet 110 remain substantially co-planar with the adjacent upper 118 and lower 120 surfaces, respectively, of the fixed wing portion 112 as the winglet 110 is pivoted between the fully raked position to the fully extended position. The winglet 110 may be pivoted relative to the fixed wing portion 112 to a plurality of pilot-selected, fixed positions by a conventional wing pivoting mechanism (not shown), such as hydraulic actuators, electro-hydraulic actuators or electric actuators. Alternately, the winglet 110 may be positioned in flight by computer control, taking into account aircraft speed and pilot turning instruction.

Turning Control

Figure 3A:
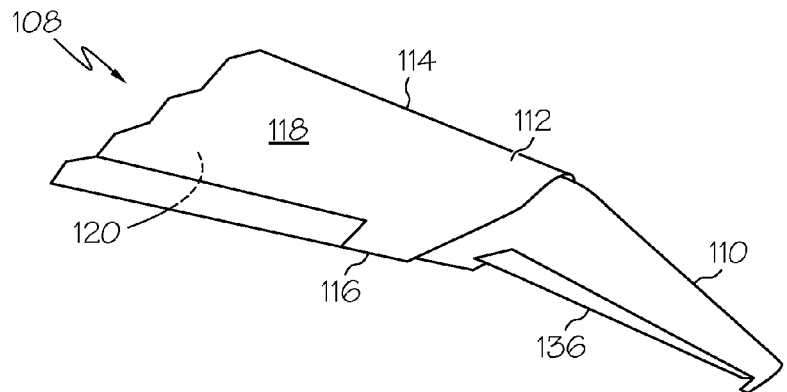
FIG. 3A is a detail showing a perspective view of the winglet of FIG. 1 in the fully extended position with an aileron in a raised position.
Figure 3B:
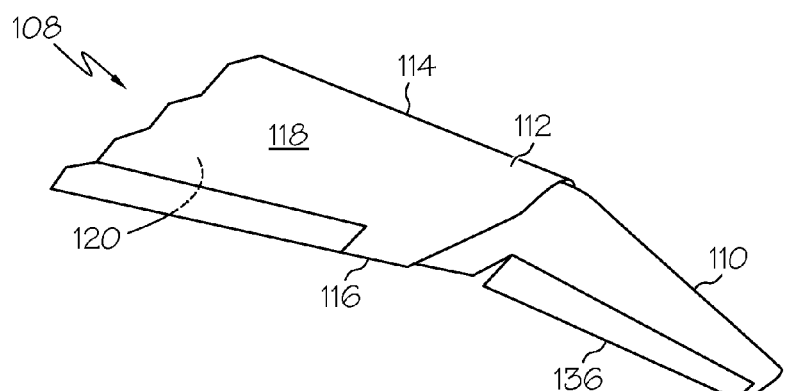
FIG. 3B is a detail showing a perspective view of the winglet of FIG. 3A with the aileron in a lowered position.
Figure 3C:
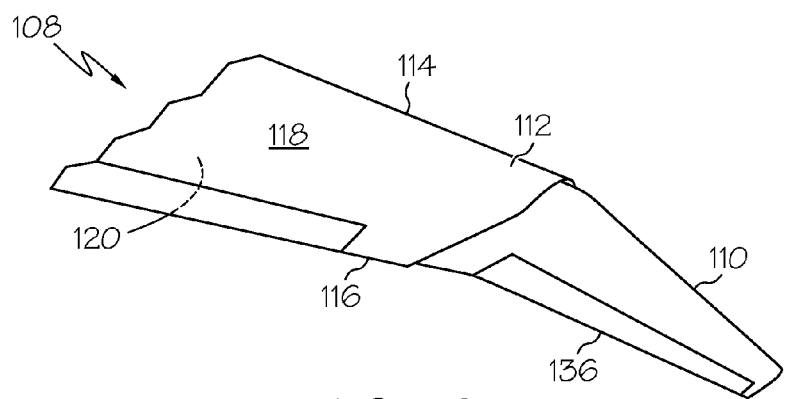
FIG. 3C is a detail showing a perspective view of the winglet of FIG. 3A with the aileron in a neutral position.

As shown in FIGS. 3A-C, the winglet 110 may include an aileron 136 that is movable between a raised position, shown in FIG. 3A, a lowered position shown in FIG. 3B and or a neutral position shown in FIG. 3C. The aileron 136 may be useful in controlling the direction of roll of the aircraft 100 (FIG. 1) by increasing or decreasing the amount of lift provided by the wing 108. The aileron 136 may be positioned by well-known control surface actuating devices (not shown), such as hydraulic actuators, electro-hydraulic actuators and electric actuators to a plurality of pilot-selected, fixed positions. Alternately, the aileron 136 may be positioned in flight by computer control, taking into account aircraft speed and pilot turning instruction.

At low aircraft speeds such ailerons 136 may be useful in rolling the aircraft 100 to effect a turn by altering the roll moment. This may be achieved by increasing the lift on the upgoing right wing 108 (shown if the aircraft 100 in FIG. 1 was banking to the left) and decreasing the lift on the downgoing left wing 108 through use of the ailerons 136.

Two competing phenomena determine the effectiveness of ailerons in roll. One phenomenon is the direct lift increment provided by aileron deflection. Downward deflection of the aileron increases the wing's camber and effective incidence, thereby increasing lift. Upward deflection does the opposite. Typically, ailerons are deflected in opposite directions to roll the airplane—one increases lift on one wing; the other reduces lift on the other.

A second phenomenon conflicts with the first described above. The center of pressure of the lift increment provided by the aileron tends to be aft of the wing's torsional axis. As a result, the upward lift increment provided by a downward-deflected aileron tends to twist the wing leading edge down (and vice-versa). Thus, this wing twist tends to conflict with a direct lift increment provided by aileron deflection. This twisting effect is approximately proportional to the dynamic pressure at which the wing is operating. Dynamic pressure is proportional to air density and the square of airspeed. Thus, the twisting effect increases with speed.

At low speed, aileron control is dominated by the direct lift increment. At high speeds, the twist effect may exceed the direct lift so that the twist effect dominates and reverses the sense of the aileron control. That is, ailerons may work "backwards" at high speeds. At some intermediate speed the two effects cancel each other, rendering the ailerons ineffective.

Figure 4A:
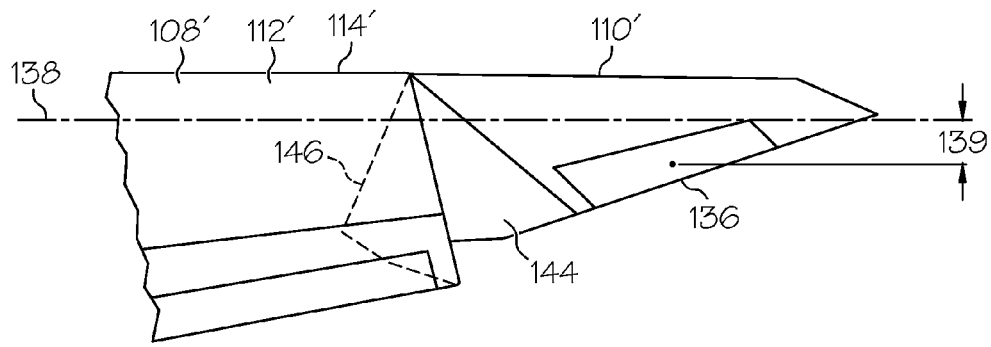
FIG. 4A is a detail showing a plan view of a second embodiment of the winglet in a fully extended position.
Figure 4B:
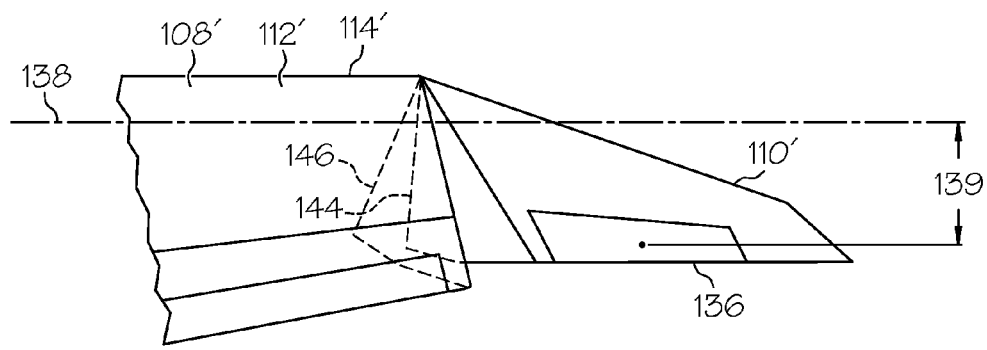
FIG. 4B is a detail showing a plan view of the embodiment of the winglet of FIG. 4A in an intermediate position.
Figure 4C:
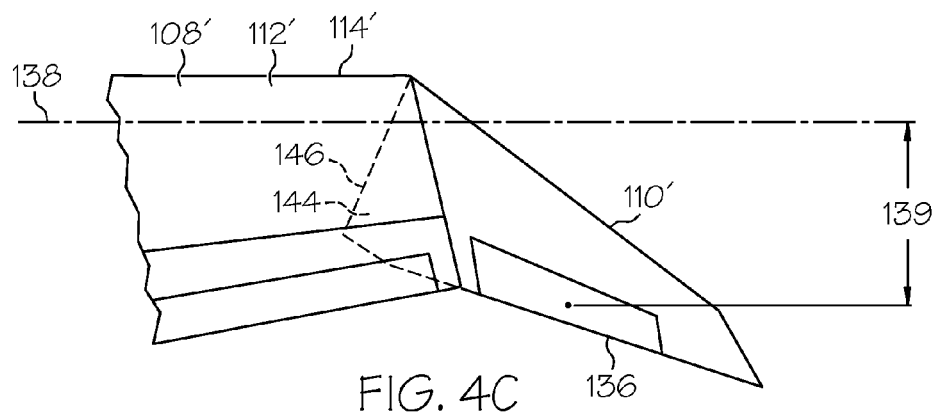
FIG. 4C is a plan view of the winglet of FIG. 4A in a fully raked position.

As shown in FIGS. 4A-C, the torsional axis 138 of the wing 108 is the axis about which the wing tends to twist at high speeds. On a conventional wing 108, the aileron 136 is positioned somewhat aft of the torsional axis 138, so that the center of pressure of the lift increment provided by the aileron is not very far aft of the wing's torsional axis. This distance is the moment arm 139 and affects the degree to which the wing twists with aileron deflection and influences the speed at which the aileron effectiveness is reversed. A short moment arm 139 may result in a modest twist response and a fairly high control reversal speed. For such an arrangement it may be that the typical range of cruise speeds overlaps with the speed at which the ailerons have little effectiveness—an undesirable condition.

Alternatively, as shown in FIG. 4C, the winglet 110' may be moved toward or to a fully raked position where the center of pressure of the lift increment provided by the aileron 136 is positioned farther away from the torsional axis 138, thereby increasing the twisting effect at higher speeds or reducing the control reversal speed. This arrangement may be advantageous if the aircraft 100 (FIG. 1) is operated at or near the traditional control reversal speed where control of the aircraft may be sluggish or even nonresponsive.

According to one embodiment of the disclosed apparatus, the position and control of turning the aircraft may be computer controlled. The controlling computer may determine the aircraft speed and turning instruction and selectively raise or lower the aileron 136 on the winglet 110 according to the aircraft speed. Further, the controlling computer may actively monitor aircraft speed and adjust the position of the winglet 110 between the fully extended and fully raked position to optimize control of the aircraft 100. Finally, the wing 108 may further include secondary or inboard ailerons (not shown) that are less powerful in providing roll control but are also less susceptible to control reversal due to the increased torsional rigidity of the inboard wing. If the aircraft 100 is operating at or near a control reversal speed, the controlling computer may opt to turn the aircraft (upon signal from the pilot) utilizing the inboard ailerons rather than the outboard ailerons 136.

By utilizing the winglets 110 in this manner, control of the aircraft by means of outboard ailerons 136 may be maintained both at or near what otherwise would be control reversal speed and when aileron control actually has been reversed at higher speeds.

Aircraft Lift Distribution, Maneuvering and Gust Loads

An airplane's lift distribution describes the spanwise distribution of lift of the airplane as a system (wing-body-tail). For a given flight condition there exists an ideal lift distribution that provides the least drag. The design of wings is generally tailored to balance several considerations including lift distribution for drag, wing structural weight and load alleviation.

An ideal aerodynamic lift distribution is different from an ideal structural lift distribution. The aerodynamic lift distribution tends to provide more lift in the outboard portion of the wing to achieve an approximately elliptical distribution. A structural lift distribution tends to reduce the outboard lift and increase lift inboard as a means to reduce the bending moment on the heavy inboard portion of the wing—this reduces wing structural weight. One favorable arrangement is to strive for a favorable aerodynamic loading during 1-g cruise while achieving a more favorable structural loading during the higher g maneuvers that tend to determine the wing structural design and weight. Many modern wing designs accomplish this favorable arrangement to some extent by carefully tailoring the structure and planform of the wing. A swept wing inherently provides a coupling between bending deflection and twist such that higher-g maneuvers tend to move the lift distribution inboard. These wings can be carefully tailored to be the most efficient at a single load condition. Alternate loading conditions may result in a less favorable lift distribution during cruise and during higher-g maneuvers. For example, because wing twist varies with load, the wing twist (and lift distribution) will vary according to the fuel load and fuel distribution within the wing over the course of a flight. It will also vary according to the weight of the payload and the center of gravity location—this influences the load on the wing. So, for a conventional wing with fixed wing geometry it is impossible to achieve an optimal lift distribution under all cruise conditions over the course of a single flight and for flights with payloads of different weight. This is especially true for long range airplanes for which there is a substantial variation in fuel weight during the flight. Furthermore, there is a conflict between reducing the effect of variations in weight on cruise efficiency and achieving an effective structural lift distribution during high-g maneuvers. The former favors a rigid wing whereas the latter favors ample bend-twist interaction.

Another factor influences wing twist and the resulting lift distribution. This is the airplane's airspeed, or more strictly, dynamic pressure. Increased speed tends to twist the wing leading edge down. This twist is cumulative from the side of body so that the amount of twist increases toward the wing tip.

This twist tends to move the lift distribution inboard relative to a lift distribution at lower airspeed.

Adjustments to the sweep angle of the winglet can, to some extent, control the twist distribution of the wing. Increasing winglet sweep tends to wash out the outboard portion of the wing and move lift inboard. This adjustment can be used to fine-tune wing twist during cruise to account for variations in fuel or payload weight and counteract the natural twist that arises from a swept wing's bending curvature. For example, the wing may be tuned with minimum winglet sweep for a fully-loaded airplane. For lighter conditions that arrangement that result in less inherent wing twist, the winglet can be swept aft to approximately restore the optimal wing twist. This can reduce drag and fuel burn.

Winglet sweep can also be applied dynamically to reduce wing bending load during maneuvers or gusty conditions. In such cases, the winglets can be swept aft to increase wing washout with increased load. This can permit lighter wing structure.

Adjustments to wing twist can also be made with the winglet aileron. When the winglet is swept aft to some degree, wing washout can be increased with downward deflection of the aileron and vice versa.

Determination of various ideal lift distributions may be made beforehand for various flight conditions, including altitude, air speed, and weight. The effect of adjusting the winglets 110 on the lift distribution is also generally knowable. Therefore, the position of the winglets 110 may be adjusted during flight, either manually by the pilot or automatically by computer, to adjust the lift distribution to thereby increase aircraft efficiency.

In addition to influencing wing lift distribution, the sweep angle of the winglets also affects the wing span. Increased span is favorable to aerodynamic efficiency. Reduced span is favorable to structural efficiency and light weight. Note that the likely optimal winglet sweep angle for lift distribution is similar to that for the greatest span—these effects are complimentary. The optimal winglet sweep angle for wing load alleviation and structural efficiency are also similar—so these effects are also complimentary.

Arrangement of Winglets

As shown in FIGS. 2A-C, as the winglet 110 moves from the fully extended to fully raked position a gap 142 may develop a gap between the winglet 110 and wing 108. This gap 142 may cause vortices or increase drag on the wing 108, thereby increasing the drag coefficient and reducing the efficiency of the aircraft 100. Therefore, several methods of avoiding the development of this gap are provided.

As shown in FIGS. 4A-C, according to a second embodiment the winglet 110' may include a solid filler 144 that passes into a cavity 146 formed within the fixed wing portion 112' as the winglet 110' travels from the extended position (FIG. 4A) to the raked position (FIG. 4C). This solid filler 144 does not require additional moving parts and is easier to manufacture, install and operate.

Figure 5A:
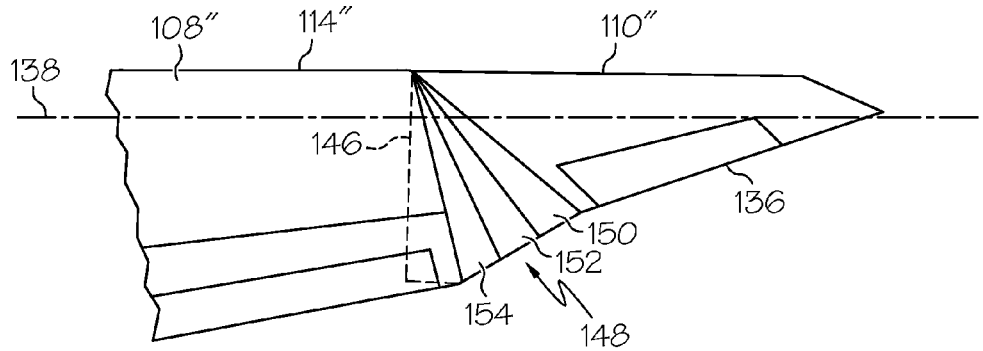
FIG. 5A is a detail showing a plan view of a third embodiment of the disclosed winglet in a fully extended position.
Figure 5B:
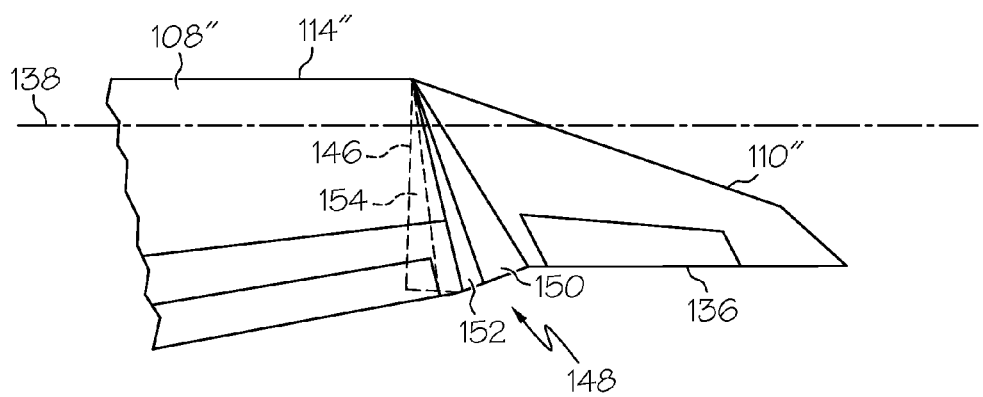
FIG. 5B is a detail showing a plan view of the winglet of FIG. 5A pivoted to an intermediate position.
Figure 5C:
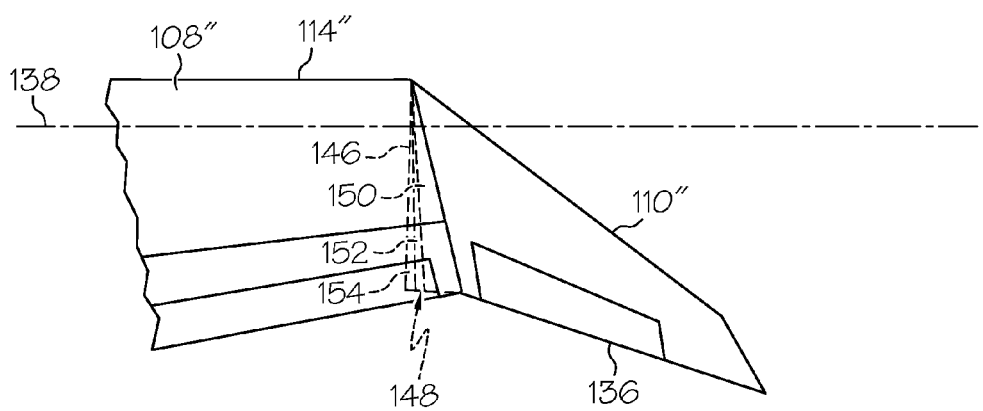
FIG. 5C is a detail showing a plan view of the winglet of FIG. 5A pivoted to a fully raked position.

As shown in FIGS. 5A-C, according to a third embodiment the winglet 110" may include a telescoping filler 148 that collapses into a cavity 146 formed within the fixed wing portion 112" as the winglet 110" is moved from the fully extended position (FIG. 5A) to the fully raked position (FIG. 5C). The telescoping filler 148 may include segments 150, 152, 154 shaped to nest relative to each other. For example, segment 150 may be shaped to pivotally slide over segment 152, and segment 152 shaped to pivotally slide over segment 154. Alternatively, Segment 154 may be shaped to pivotally slide over segment 152, and segment 152 shaped to pivotally slide over segment 150. With either configuration of segments 150, 152, 154, the cavity 146 may be sized only slightly larger than the outermost of the nested segments. The telescoping filler 148 requires a smaller cavity 146 in the fixed wing portion 112" of the aircraft 100 when compared to the solid filler 144, but requires moving parts which may be more expensive or difficult to install.

Those having skill in the art will understand that a variety of fillers may be utilized without departing from the scope of the invention. The filler must satisfy the requirement of filling the space between the winglet 110 and the wing 108 as the winglet 110 is moved between the fully extended and fully raked positions. Further, the filler preferably includes an airfoil shape to provide a continuous wing surface.

Figure 6A:
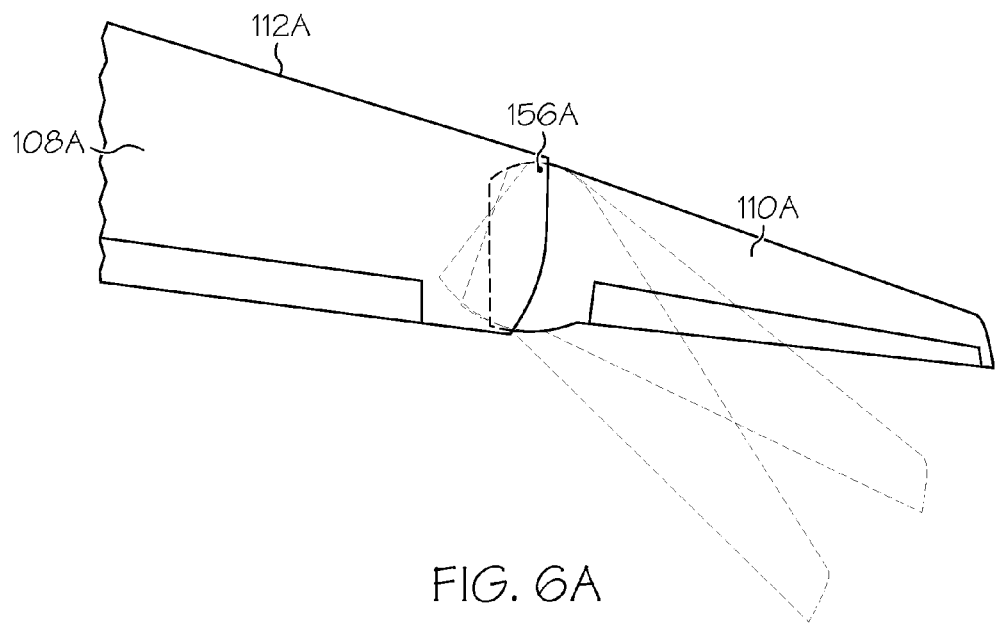
FIG. 6A is a detail showing a plan view of the aircraft wing in which the pivot point of the winglet is positioned near a leading edge.
Figure 6B:
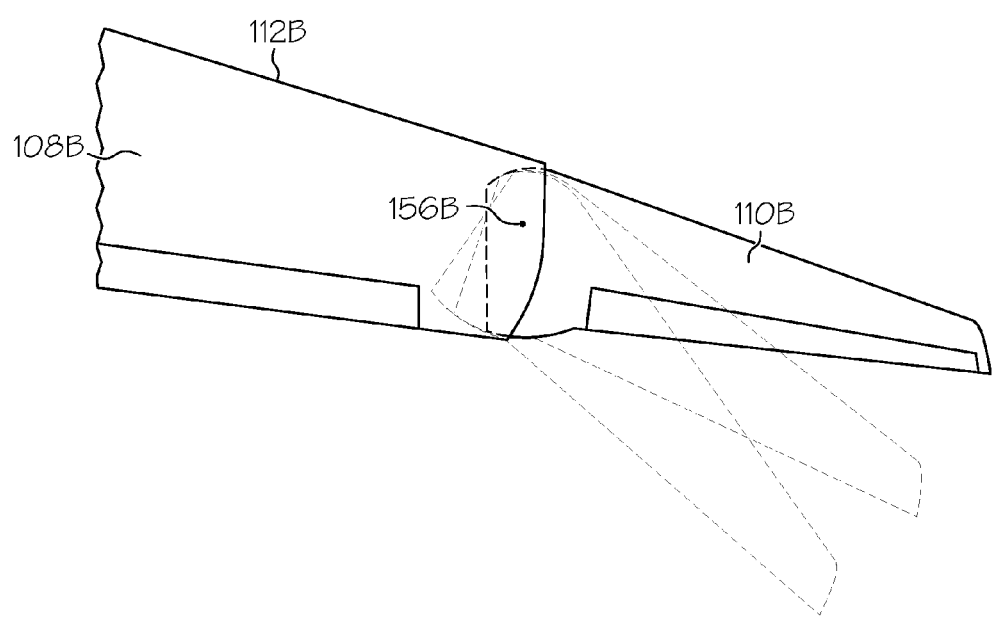
FIG. 6B is a detail showing a plan view of the aircraft wing in which the pivot point of the winglet is positioned between the leading and trailing edge.
Figure 6C:
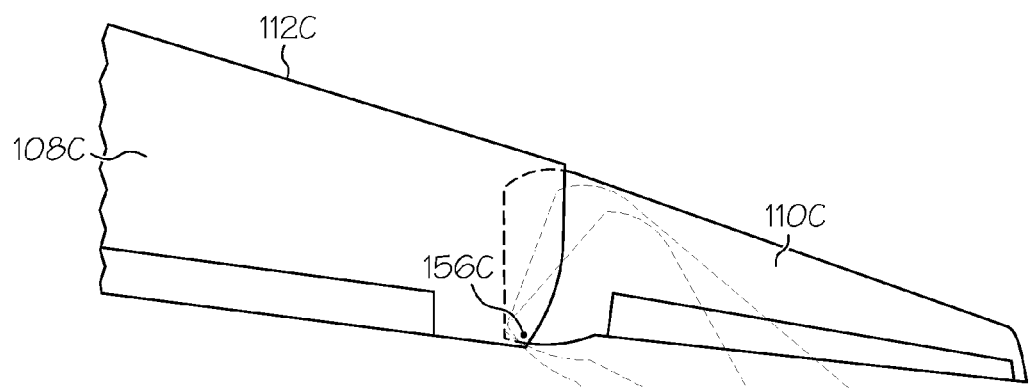
FIG. 6C is a detail showing a plan view of the aircraft wing in which the pivot point of the winglet is positioned near a trailing edge.

As shown in FIGS. 6A-C, the pivot point 156A, 156B, 156C of the winglet 110A, 110B, 110C may be positioned at or near either the leading edge 126 of the wing 108A (FIG. 6A), trailing edge 128 of the wing 108C (FIG. 6C), or at some point between the two, shown, for example, positioned as winglet 110B (FIG. 6B). The position of the pivot point 156A-C of the winglet 110A-C on the wing 108A-C may be based on the ease of assembly and design or based on various lift profiles that may be desired. In FIGS. 4A-C and 5A-C, the winglet 110', 110" is shown as pivoting substantially about the leading edge 114', 114" of the wing 108', 108". However, this design may not be preferred in all circumstances.

The pivot axis of the pivot point 156A-C of the winglet 110A-C is approximately parallel to the yaw axis of the aircraft 100 (FIG. 1). Precise adjustments to the orientation of the pivot axis can provide coupling between the sweep angle of the winglets 110A-C and its angle of incidence and dihedral angle. This can provide additional degrees of freedom in achieving a favorable design. For example, tilting the axis of the pivot point 156A-C slightly outboard may reduce the incidence of the winglet in its swept position relative to its incidence in the forward position.

A variety of arrangements may be used in order to fill the gap between the wing and winglet. The various embodiments of the disclosed winglet design and operation described above are single variations, but those having skill in the art will appreciate that the filler may be a solid, deformable elastic, telescoping, or other variation.

Adjustable Wing Span

Increasing effective wingspan generally has a positive effect on aircraft efficiency. However, aircraft wingspan may be limited by the space available at airports. The improved winglets 110 described herein allow the wingspan of the aircraft 100 to be improved during flight by extending the winglets 110 to a fully extended position. When the aircraft is grounded, the winglets 110 may be moved to the fully raked position, thereby reducing the wingspan of the aircraft.

The above description includes several sample embodiments of the invention and is not intended to limit the scope of the invention. A person having ordinary skill in the art will appreciate that variations may be made to the above-described apparatus without departing from the scope of the invention. Any limitations to the invention will appear in the claims as allowed.

What is claimed is:

1. A method of controlling an aircraft during flight, the method comprising:

providing an aircraft having a swept-back, fixed wing portion extending away from a fuselage of said aircraft, said fixed wing portion including an inboard side adjacent said fuselage, an outboard side opposite said inboard side, a leading edge, a trailing edge, an upper surface, a lower surface, and a torsional axis;

providing a movable winglet attached to said fixed wing portion at said outboard side to pivot relative to said fixed wing portion about an axis approximately parallel to a yaw axis of the aircraft;

providing an aileron on a trailing edge of said winglet and pivotable relative to said winglet;

determining a control reversal speed wherein raising or lowering said aileron has no effect on aircraft roll;

selectively pivoting said winglet between from a fully extended position and a fully raked position to adjust said control reversal speed; and inverting aileron control at a speed above said control reversal speed.

2. The method of claim 1, wherein said aileron when deflected creates a lift increment with a center of pressure and said fixed wing portion includes a torsional axis.

3. The method of claim 2, wherein said center of pressure is collinear with said torsional axis when said winglets are in a fully extended position.

4. The method of claim 3, wherein said center of pressure is aft of said torsional axis when said winglets are in a fully raked position.

5. A method of controlling an aircraft during flight, the method comprising:

providing an aircraft having a swept-back, fixed wing portion extending away from a fuselage of said aircraft, said fixed wing portion including an inboard side adjacent said fuselage, an outboard side opposite said inboard side, a leading edge, a trailing edge, an upper surface, a lower surface, and a torsional axis;

providing a movable winglet attached to said fixed wing portion at said outboard side to pivot relative to said fixed wing portion about an axis approximately parallel to a yaw axis of the aircraft;

providing an aileron on a trailing edge of said winglet and pivotable relative to said winglet;

rolling said aircraft in a first direction by raising one of said ailerons;

inverting control at high speed such that when the aircraft is rolled in said first direction said aileron is lowered;

determining a control reversal speed wherein raising or lowering said aileron has no effect on aircraft roll; and selectively pivoting said winglet between from a fully extended position and a fully raked position to adjust said control reversal speed according to the speed of the aircraft.

6. The method of claim 5, wherein said aircraft further includes inboard ailerons on said wings.

7. The method of claim 6, further comprising controlling roll of said aircraft with said inboard ailerons when said aircraft is at or near said control reversal speed.

* * * * *